United States Patent [19]

Dillon

[11] 4,005,916
[45] Feb. 1, 1977

[54] JACKED HYDROSTATIC BEARING

[76] Inventor: Richard H. F. Dillon, 257 Lisgar St., Apt. 1001, Ottawa, Ontario, Canada, K2P 0C7

[22] Filed: Nov. 7, 1975

[21] Appl. No.: 629,886

[52] U.S. Cl. .............................. 308/36.1; 308/72; 308/122; 308/DIG. 12; 115/.5 S
[51] Int. Cl.² ........................................ F16C 1/24
[58] Field of Search ............ 308/36.1, 93, 72, 122, 308/124, DIG. 12, 237 R; 15/.5 S, 34 R

[56] References Cited
UNITED STATES PATENTS

| 3,540,405 | 11/1970 | Clay | 308/36.1 X |
| 3,622,213 | 11/1971 | Onsrud | 308/122 |
| 3,718,378 | 2/1973 | Clay | 308/36.1 |

Primary Examiner—Joseph F. Peters
Assistant Examiner—Gene A. Church
Attorney, Agent, or Firm—D. Paul Weaver

[57] ABSTRACT

A bearing assembly for a generally horizontal shaft particularly propeller shafts for ships which includes a cylindrically lower bearing shell for cooperating with and supporting the shaft, a pair of cylindrically faced upper bearing shells also cooperating with the shaft and an upper bearing shell support means for the upper bearing shells which includes a piston and cylinder assembly between the support and shells for urging the cylindrical faces of the upper bearing shells against the shaft. Bearing fluid is led to the bearing shells, and a liquid under pressure is introduced into the piston and cylinder means. This liquid reacts against a captive chosen volume of gas to allow resilient movement of the upper bearing shells in their support means. The assembly also provides for release of the bearing from the housing, in which it is contained, by means of pressurized fluid.

14 Claims, 7 Drawing Figures

JACKED HYDROSTATIC BEARING

This invention relates to very heavily loaded bearing assemblies with external pressurization and has particular reference to stern tube bearings for ships.

BACKGROUND OF THE INVENTION

The majority of structures used today for the foregoing applications are extremely primitive and take the form of stave bearings generally of wood (lignum vitae) although there are other materials now in use including rubbers, phenolics, etc. Many operators having employed these new materials have however shifted back to lignum vitae because they did not justify the increase in costs without a proportionate decrease in rate of wear down. The lack of availability of the materials in an emergency was also significant.

To describe the water lubricated stern tube stave bearing as a bearing is a technical misnomer. It is merely a guide which grinds itself to destruction and has to be replaced. This is because the separate staves destroy the hydrodynamic film so that hydrodynamic lubrication is impossible at any shaft speed. Wear down is therefore inevitable and sometimes fairly rapid. See "Report of Ships Operators Experience with Stern Tube Bearing Wear". Technical and Research Bulletin No. 3 – 12 published by the Society of Naval Architecs and Marine Engineers, 74 Trinity Place, New York 6, N.Y., in September, 1962.

Apart from the wear of the bearing material, undesirable conditions accompany the wear due to increased vibration caused by shaft whirl, which not only makes the vessel uncomfortable to inhabit, but can lead to destructive effects on the ship's structure.

The result of the use of these inadequate bearings and materials, albeit they are the best known to the industry, is expense in dry docking fees and outage time, frequently leading to replacement of the bearings more often than absolutely necessary because of the uncertainty of wear down rate and the excessive expenses involved in extra drydocking between normal routine overhaul of the ship. It is interesting that in spite of the knowledge of the drawbacks of current bearings, no satisfactory solution has been found.

It is important to realize that because no shaft is ever in precisely correct alignment, because the ship's structure is flexible, and because the shaft alignment can alter radically between partial and full cargo conditions, effects on a fixed bearing can be disastrous.

For the purpose of illustration, let us take the case of a contemporary super-tanker built to the requirements of Lloyds of London. Assume it has a 3 foot tail shaft, and a propeller plus tail shaft weight of say, 60 tons. Lloyds would require a stern tube bearing four diameters long, or 12 feet. Unfortunately this long bearing is of little use, because the overhung mass of the propeller bends the shaft, so that in all of the 12 feet the journal is probably bearing hard at one section only, and because of the resulting inaccuracies proper support of the shaft by hydrodynamic film is impossible. Thus, from its birth the bearing is on its way to its demise. A bearing to be a bearing must be extremely accurate. The bearing just described in extremely inaccurate even with perfect alignment. The problems which are additive - incorrect stern tube boring and shaft alignment combine to produce an unscientific monster.

Points which should be a feature of the solution to the problem of the prior art are:
1. The bearing should not be subject to wear, or at least the wear should be minimal.
2. Lubrication, and hence security of the bearing, should be stable down to at least one r.p.m. and preferably at all speeds since very excessive wear can be expected to result on plummer blocks and stern tubes by the very slow revolutions given to the shaft (several minutes per revolution) during warming up and cooling down processes when there is no possibility of a hydrodynamic film being established on the surface of the conventional bearings.
3. The bearing should be self-aligning to allow for variations in shaft alignment both initially and due to loading, pitching and yawing movements during operation of the vessel. This alteration in alignment can have disastrous effects on a fixed bearing.
4. The bearing should not be subject to whirl, and radial run-out of the shaft should be an absolute minimum to ensure stability and long life to any seal fitted to the shaft.
5. The friction should be minimal.
6. The bearing should be designed for a rubbing speed of about 1,000 feet per minute which appears compatible with the 15″ shaft of the destroyer type vessel which rotates at approximately 250 r.p.m., or the three foot diameter of super tankers rotating at approximately 100 r.p.m.

The present disclosure provides a solution to the problems enumerated above, and although the bearings here described are perforce of higher initial complexity than the simple wood bearings or oil or greased lubricated bearings employed in the past, their life is considerably longer and if not abused can be expected to equal or out-perform the life expectations of the main propulsion machinery in the vessel. Because the new bearing provides for a stable shaft, accurate seals of high tolerance can be employed and with subsequent longer life and absence of failure.

SUMMARY

More particularly in accordance with the invention there is provided, a bearing assembly for a generally horizontal shaft which comprises, a cylindrically faced lower bearing shell for cooperating with and supporting said shaft, a pair of cylindrically faced upper bearing shells for cooperating with this shaft, lower bearing shell support means cooperating with and supporting said lower bearing shell, upper bearing shell support means cooperating with said upper bearing shells, means for leading bearing fluid under pressure to the cylindrical faces of said lower and upper bearing shells respectively, said upper bearing shell support means comprising means for urging the cylindrical faces of said upper bearing shells against said shaft and for urging said shaft against said lower bearing shell, said urging means comprising cooperating piston and cylinder means on said upper bearing support means and said upper bearing shells, and means for introducing liquid under pressure into said cylinder means. Preferably a space containing a chosen volume of gas under pressure of the liquid in the cylinder means and in connection with the cylinder means allows resilient movement of the upper bearing shell in the upper bearing shell support means. The gas may be contained with a sealed sac. A non-return valve may be included in the liquid supply means for the cylinder means adjacent the cylinder. The cylindrical surfaces of the bearing shells may be multi-compartmented with fluid flow metering means defined in the bearing shells for supplying the bearing fluid individually to the compartments. The bearing may be placed in a housing sealed to the shaft on at least one side to prevent leakage of bearing fluid from the housing axially of the shaft. A low pressure warning indicator may be included in the fluid supply means to the lower bearing shell. At least one of the upper and lower bearing shell support means may be received on a surface tapering outwards radially of the shaft to one side of the housing and means may be provided for introducing fluid under pressure to the other side of the housing for forcing the support means down the taper for release of the bearing. Releasable sealing means may be included for cooperation with the shaft for sealing fluid against egress from the other side of the housing.

BREIF DESCRIPTION OF THE DRAWINGS

Reference will now be made to the accompanying drawings showing preferred embodiments of the invention in which:

FIG. 1 is a side view partly in section of a propeller and shaft assembly incorporating the bearing here described, FIG. 2 is a view of part of FIG. 1 but in greater detail, FIG. 3 is an end view of the bearing in partial section, FIG. 4 is a schematic diagram of a typical lubricant flow circuit for one type of bearing embodying the invention, FIG. 5 is an isometric view of the bottom bearing shell of FIG. 2, FIG. 6 is a typical pedestal bearing in side view partially in section embodying the invention and, FIG. 7 is a sectional view through part of a lower bearing shell.

DESCRIPTION OF THE PREFERRED EMBODIMENTS

Figure 1:
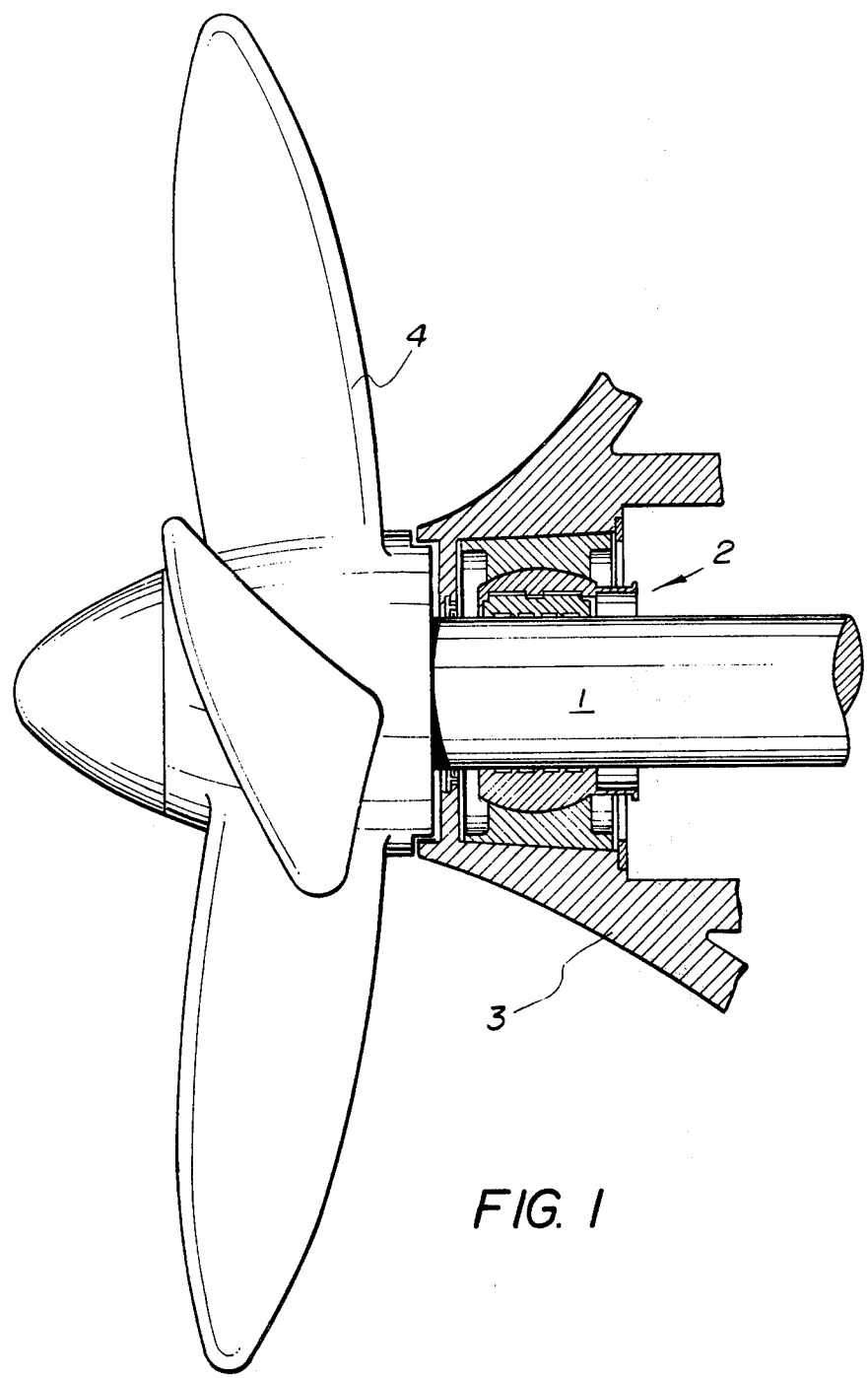

In FIG. 1 a shaft 1 passes through a bearing assembly 2 mounted within a ship's structure 3 to drive a propeller 4.

Figure 2:
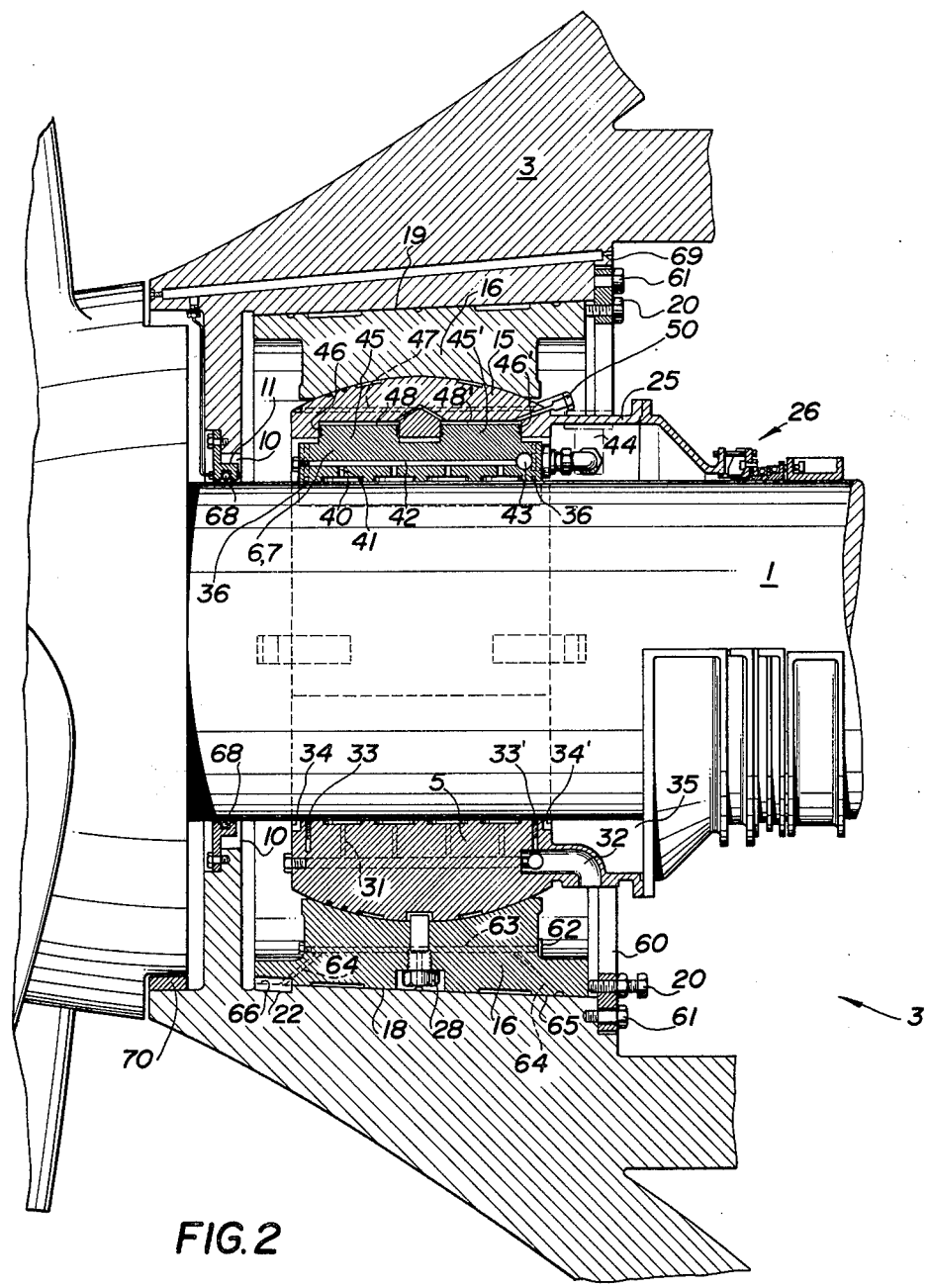
Figure 3:
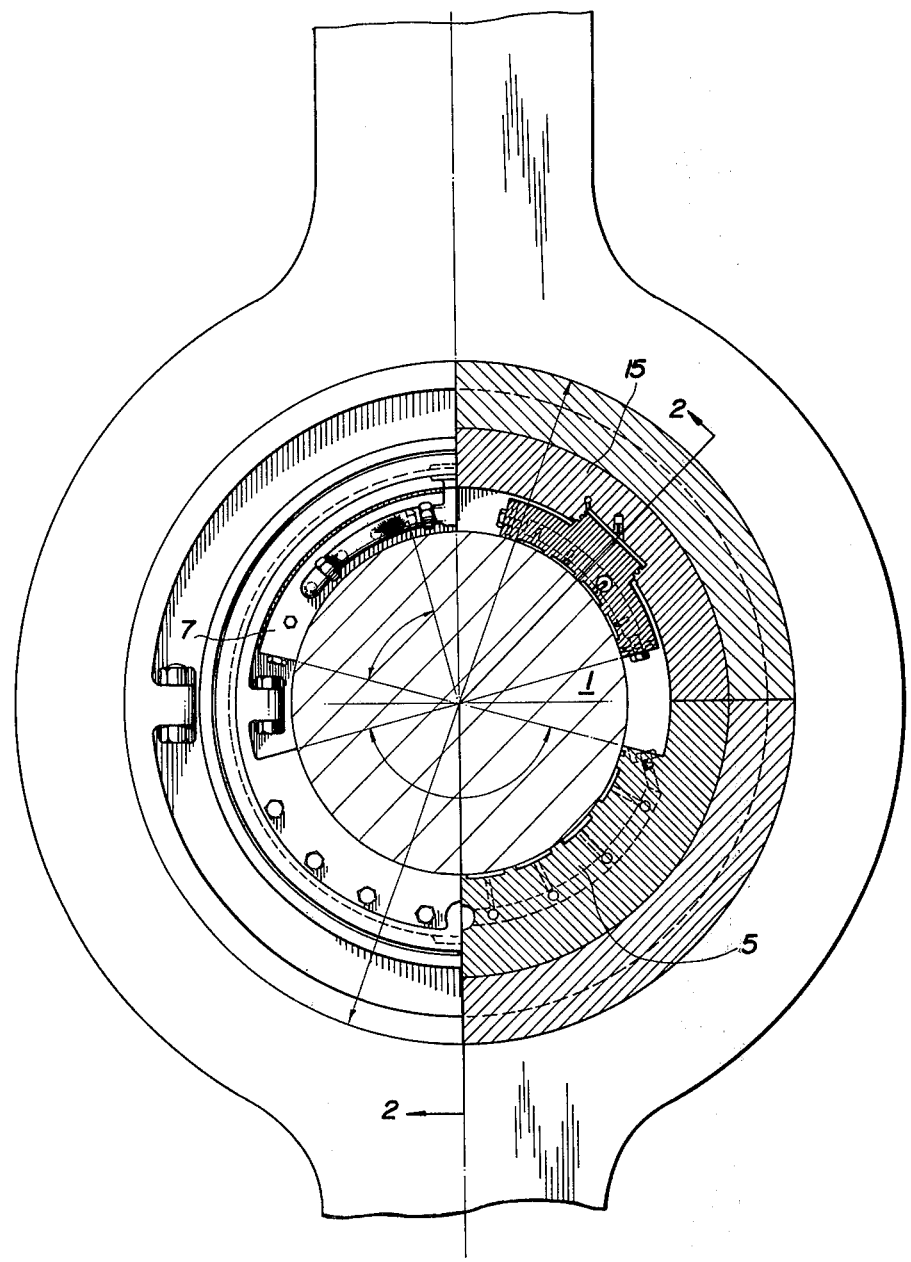
Figure 5:
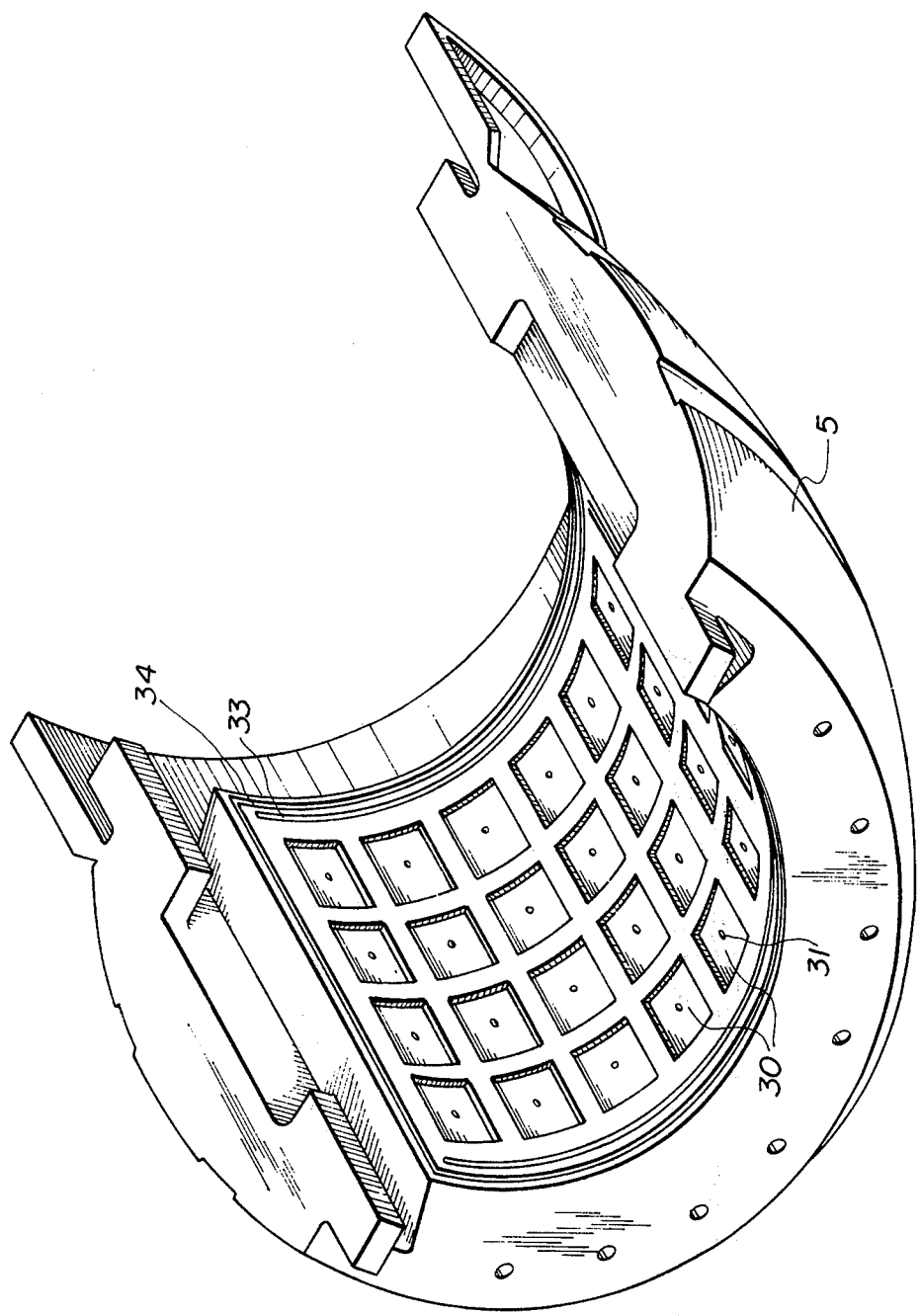

Further detail of the bearing assembly can be seen with reference to FIGS. 2 and 3. The shaft is supported on a lower bearing shell 5 and located in position by jacked upper bearing shells 6 and 7. Additional detail of bearing shell 5 is shown in FIG. 5. In the embodiment of FIGS. 2 and 3 the bearing is intended to be water lubricated and therefore is open to the environment in which the propeller runs, through the space between the shaft and the bearing housing at 10. For the purposes of servicing the bearing an inflatable seal and supporting assembly 11, which will be described later, is placed in the area 10.

The assembly of shells 5, 6 and 7 is spherically mounted to allow for the bearing to be self aligning with the shaft. The shell 5 is thus continuous with the upper bearing support assembly 15 in which the shells 6 and 7 are mounted, and is carried on the spherical socket assembly 16. The socket assembly 16 is a taper fit within the structure 3 as shown at 18 and 19 and is retained in position by periferally arranged bolts 20. A key is provided at 22 positively to prevent any rotation of the socket assembly when in position. Integrally attached around entire periphery of the assembly 5 and 15 is a collar 25 extending axially of the shaft in the direction away from the propeller. The collar carries a circumferential seal assembly 26 (suitably a Ronald Trist seal) which prevents leakage of water lubricant in the bearing assembly from passing into the interior of the ship. Limitation of movement of the assembly 5, 15 while allowing sufficient for full self-alignment is effected by the stop bolt 28.

Figure 7:
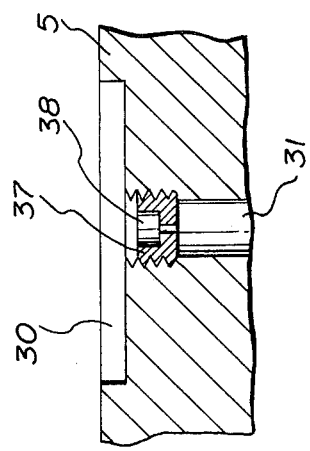

As can be seen with reference to FIG. 5, the lower bearing shell 5 consists of slightly less than a hemi-cylinder whose inner surface is subdivided into a number of lubricant supply pockets 30, with central supply passages 31, connected within the shell to a manifold 32 by drilling. The manifold is supplied with lubrican through a flexible hose (not shown). The bearing is preferably cast in bronze and coated with resin-bonded asbestos fiber. The shaft is preferably ceramic coated in the region of the bearing and provided with a mirror finish. This bearing shell includes a spring loaded sealing ring 33 for stability of bearing film pressure, and an energy dissipating groove 34 vented to housing spaces 10 and 35. Shells 6 and 7 may also include energy dissipating grooves 36 (see FIG. 2). Preferably included within the passages 31 just below the pockets 30 illustrated in FIG. 7 are flow restricting orifice members 37 with orifices 38. In the embodiment shown the lubricant is supplied under chosen constant pressure to manifold 32 and the sizes or orifices 38 are so chosen that proper flow to the bearing face for shaft support occurs without loss of manifold pressure during dynamic movements of the shaft away from the bearing face. The members 37 may be provided in the area 39 with Allen key or other suitable forming so that they can be removed and inserted into the passages 31 as required in construction.

The upper bearings 6 and 7 are also constructed with a number of lubricant supply compartments 40 supplied individually through passages 41 from drillings 42 fed in turn from a manifold 43 and supplied through flexible hoses 44 with lubricant liquid. The drillings 42 may also include orifice members similar to members 37. Each of these bearing shells 6 and 7 carries piston extensions 45 and 45' running in cylinders 46 and 46' respectively. The spaces 48 and 48' internally of the cylinders are pressurized with liquid under predetermined pressure fed through passage 47 in order to force the bearings 6 and 7 against the shaft 1 and to retain the bearing assembly accurately in aligned position with the shaft. While the spaces in cylinders 46 and 46' are filled with liquid, air is present in one or more small bosses or chambers 50 connected to the spaces 48 and 48' (either directly or through passage 47. Liquid is fed to passage 47 under pressure through a non-return valve by means, not shown, such as a high pressure flexible pipe. The shells 6 and 7 are thus held against the shaft with a predetermined force. Because of the presence of the air cylinders the retention of the shells 6 and 7 is partially resilient. This partial resilience allows movements of the pistons outwards radially of the shaft to accommodate changes in thickness of the working fluid film between the shaft and the upper and lower bearing shells. Except for these miniscule movements of the pistons 45 and 45' in the working mode, they are locked against upward movement by a non-return valve in the line supplying passage 47.

The gas in the chambers 50 may be enclosed in a sealed sac.

In normal operation the jacking of the bearings against the shaft which therefore holds the shaft properly in position on the lower bearing shell 5 ensures accurate alignment of the bearing, and positioning of the shaft in the ship's structure regardless of loading of the ship, or of the effect of heavy seas.

Figure 6:
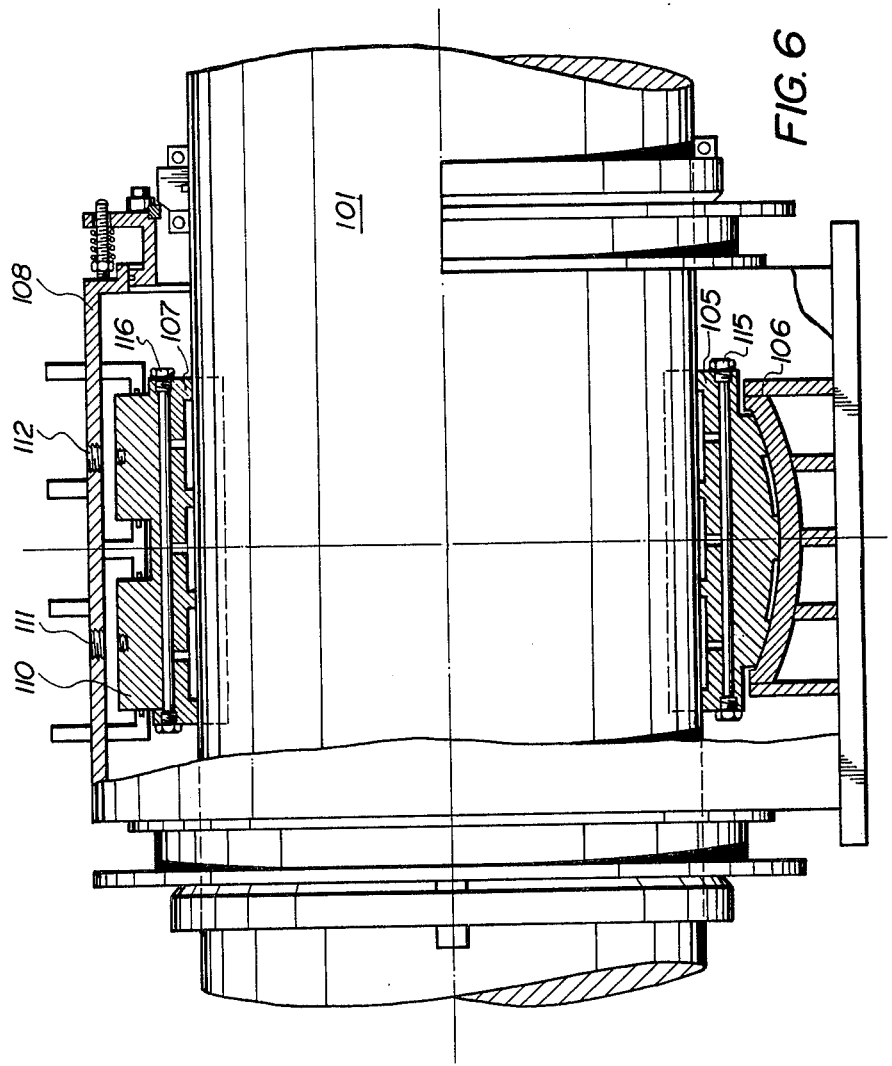

Reference to FIG. 6 shows a modified form of bearing for a shaft intended for inboard use sealed at both ends of the bearing and which the lower shell 105 is carried on a pedestal 106. The upper bearing shells 107 are supported in the bearing structure 108. In this instance pressurizing fluid for the pistons 110 on the bearings 107 is supplied through entry passages 111 and 112, whereas fluid for lubrication of the upper and lower bearings is provided respectively at 115 and 116. Drain means (not shown) are also provided within the bearing housing for drawing off lubricant liquid and returning it to a pump.

Figure 4:
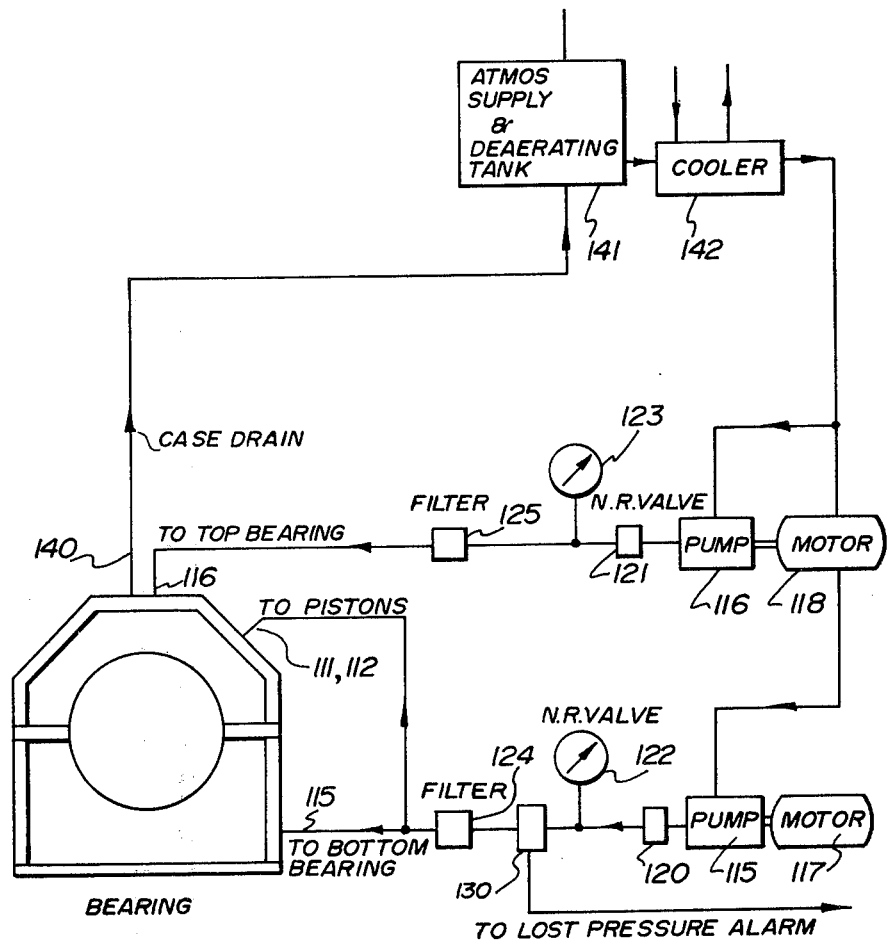

A typical supply arrangement for the bearing of FIG. 6, but equally adaptable to that of FIGS. 2 and 3, is shown in FIG. 4 as a closed circuit, where pumps 115 and 116 are driven by motors 117 and 118 through non-return valves 120 and 121 with pressure measured at guages 122 123. The lubricant passes through filter 124 to the bottom bearing passage 115 and to piston passages 111 and 112, and through filter 125 to top bearing supply 116 passage. An alarm bleed off at 130 allows detection of the supply pressure to the bottom bearing so that in the event of loss of pressure here rotation of the shaft can be avoided or terminated. Liquid leading from the shells or from the jacking piston assembly is picked up by the case drain, passes via pipe 140 through deaerating tanks 141, if necessary cooler 142, and returns to the pumps.

As an example off typical lubricant pressures likely to be employed in a closed bearing assembly, assume a sixty ton propeller tail shaft assembly. With the new bearing disclosed here this can be a length of two feet four inches which contrasts very interestingly with the twelve foot bearing required under the Lloyd's specification.

Total Weight on Bottom Bearing
= 60 + 20 Sine 45°
= 74.4 Tons.
Minimum bearing compartment pressure to lift shaft
= 74.14 × 2240/884 = 187.86 P.S.I.   Say 190 P.S.I.
Top Pistons (8 ¾" dia.)
Effort 10 Tons each = 22400 lbs.
Area of pistons = 117.89 sq. ins.
Pressure level = 22400/117.89 = 190 P.S.I.   190 P.S.I.
Top Bearings
Load 10 Tons each
Minimum compartment pressure = 22400/396
= 56.56 P.S.I.   Say 60 P.S.I.

Compare Conventional Bearing

Main Gear Wheel Destroyer Type Vessel (15,000 S.H.P./Shaft at 227 r.p.m.) Side Thrust 58,000 lbs Bearing 14.88 inches × 12.5 inches = 186 sq. ins Pressure level 58,000/186 = 312 P.S.I. on projected area i.e., the actual pressure is perhaps double this figure.

Pressures in the new hydrostatic bearing here disclosed are therefore very modest.

In the bearing of FIGS. 2 and 3 if sea water lubrication is employed, supply can be taken to the pumps, after filtering, directly from the environment. If a different liquid is used such as oil, it would also be necessary to seal the outer end of the housing to the shaft in the area of seal 68 with a permanent seal. By maintaining a pressure in the housing slightly above that of the sea water at the depth of the propeller 4 no leakage of water into the housing would occur.

When it is necessary to remove the bearing assembly 2 from the ship's structure the seal 68 is expanded by the application of air or liquid pressure at inlet 69 thus expanding the seal 68 into contact with the shaft. Air pressure is released at the bosses or chambers 50 to free the pressure on the shaft from bearing shells 6 and 7. Bolts 20 and 21 are then released (see FIG. 2) and the retaining plate 60 held by bolts 61 is removed. Liquid under pressure is applied at 62 which led through passage 63 and drillings 64 applies pressure in the area 65 and 66 of the surface 18 releasing the bearing assembly which can then be drawn out axially of the shaft. Withdrawal screws (not shown) may be mounted on plate 60 and engaging in threaded holes in assembly 16 to effect this. Suitably, the screws are placed on the same pitch circle diameter around plate 60 as bolts 20. As the bearing assembly is withdrawn the propeller rests on the pad 70 as shown.

The bearing thus described is subject to minimal wear since the tail shaft propeller assembly is in area contact with the bearing shells by virtue of the film of liquid continuously supplied to the bearings 5, 6 and 7. The film is present at all speeds of the shaft, thus obviating the destruction which occurs in conventional bearings when the shaft is rotating very slowly (e.g., when barring over the steam turbine, sometimes for several hours, during the warming up or cooling down process). The self-aligning feature ensures that the bearings always properly support the shaft, and by use of the partial bearings the problem of shaft whirl is completely avoided since the partial bearing configuration is not subject to whirl. Friction in the bearing is minimal because a liquid of low viscosity such as water or a relatively light oil can be employed.

Note also that in the pedestal bearing of FIG. 6 only the lower bearing 105 is shown as having a spherical faced support since accurate alignment for the upper bearings, which are much more lightly loaded and which in any event have a certain amount of movement of their pistons, may not always be required.

The embodiments of the invention in which an exclusive property or privilege is claimed are defined as follows:

1. A bearing assembly for a generally horizontal shaft which comprises,
   a cylindrically faced lower bearing shell for cooperating with and supporting said shaft,
   a pair of cylindrically faced upper bearing shells for cooperating with this shaft,
   lower bearing shell support means cooperating with and supporting said lower bearing shell,
   upper bearing shell support means cooperating with said upper bearing shells,
   means for leading bearing fluid under pressure to the cylindrical faces of said lower and upper bearing shells respectively,
   said upper bearing shell support means comprising means for urging the cylindrical faces of said upper bearing shells against said shaft and for urging said shaft against said lower bearing shell, said urging means comprising cooperating piston and cylinder means on said upper bearing support means and said upper bearing shells, and means for introducing liquid under pressure into said cylinder means.

2. Apparatus as defined in claim 1 comprising, means defining a space in connection with said cylinder means for retention of a captive chosen volume of gas under pressure of said liquid for allowing resilient movement of said upper bearing shell in said upper bearing shell support means.

3. Apparatus as defined in claim 1, and said lower bearing shell having a spherical lower face, and said lower bearing shell support means being spherically faced for cooperation with said lower bearing shell spherical face.

4. Apparatus as defined in claim 1, and said means for introducing liquid to said cylinder means comprising a non-return valve adjacent said cylinder means.

5. Apparatus as defined in claim 2, and said space being of chosen volume with respect to the face area of said piston for permitting resilient movement of said upper bearing shell sufficient only to accommodate variations in film thickness of lubricant at the cylindrical faces of said upper and lower bearing shells.

6. Apparatus as defined in claim 5, and said gas being contained within a sealed sac.

7. Apparatus as described in claim 1, wherein said cylindrical surfaces are multi-compartmented; and fluid flow metering passages defined in said bearing shells for supplying the bearing fluid individually to said compartments.

8. Apparatus as defined in claim 1, and said bearing fluid leading means leading said fluid independently to the cylindrical bearing surfaces of the lower bearing shells and the cylindrical bearing surfaces of the upper bearing shells.

9. Apparatus as defined in claim 1 comprising,
a housing for said bearing,
and sealing means between said shaft and said housing for preventing bearing fluid flow from said housing axially of said shaft, 10. Apparatus as defined in claim 1, comprising low pressure warning means in said bearing fluid supply for said lower bearing shell.

11. Apparatus as defined in claim 1, comprising a housing,
at least one of said upper and lower bearing shell support means being received in said housing on a surface tapering outwards radially of said shaft to one side of said housing,
means for introducing fluid under pressure to the other side of said housing for forcing said support means to said one side of said housing for release of said bearing from said housing.

12. Apparatus as defined in claim 11, comprising releasable sealing means cooperating with said shaft for sealing fluid against egress from said other said of said housing.

13. Apparatus as defined in claim 11, and including screw means for withdrawing said support means in the direction towards said one side of said housing.

14. Apparatus as defined in claim 11, and including releasable screw means for retaining the shell supporting means in position in said housing.

* * * * *